United States Patent
Diab et al.

(10) Patent No.: US 8,037,323 B2
(45) Date of Patent: Oct. 11, 2011

(54) SYSTEM AND METHOD FOR USING AN ETHERNET PHYSICAL LAYER DEVICE TO IDENTIFY CABLING TOPOLOGIES

(75) Inventors: Wael William Diab, San Francisco, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 804 days.

(21) Appl. No.: 12/049,254

(22) Filed: Mar. 14, 2008

(65) Prior Publication Data
US 2009/0235094 A1 Sep. 17, 2009

(51) Int. Cl.
*G06F 1/00* (2006.01)
*G06F 13/00* (2006.01)
*G06F 15/173* (2006.01)

(52) U.S. Cl. .................. 713/300; 710/100; 709/224
(58) Field of Classification Search .................. 713/300
See application file for complete search history.

(56) References Cited

U.S. PATENT DOCUMENTS

| | | | |
|---|---|---|---|
| 7,240,224 B1* | 7/2007 | Biederman | 713/300 |
| 7,460,889 B2* | 12/2008 | Darshan et al. | 455/572 |
| 7,593,756 B2* | 9/2009 | Ferentz et al. | 455/572 |
| 7,613,939 B2* | 11/2009 | Karam et al. | 713/300 |
| 7,705,741 B2* | 4/2010 | Picard | 340/652 |
| 7,814,346 B2* | 10/2010 | Diab | 713/300 |
| 2005/0197094 A1* | 9/2005 | Darshan et al. | 455/402 |
| 2007/0278857 A1* | 12/2007 | Robbins | 307/2 |
| 2007/0288771 A1* | 12/2007 | Robbins | 713/300 |
| 2009/0083550 A1* | 3/2009 | Diab | 713/300 |
| 2009/0172421 A1* | 7/2009 | Schindler | 713/300 |

* cited by examiner

*Primary Examiner* — Suresh Suryawanshi
(74) *Attorney, Agent, or Firm* — Duane S. Kobayashi

(57) ABSTRACT

A system and method for using an Ethernet physical layer device to identify cabling topologies. A power sourcing equipment (PSE) can power independent powered devices (PDs) using two sets of wire pairs in a single four-pair cable. Higher power PSEs can power a single PD using all four wire pairs in the cable. Conventional power over Ethernet (PoE) analog techniques (i.e., voltage, current, etc.) have a difficult time distinguishing where the wire pairs are going from the PSE. By using information (e.g., negotiated speed, link energy, distance diagnostic, etc.) generated by the physical layer device (PHY) subsystem, the PoE system can determine whether the two sets of wire pairs in a cable are powering a single PD or two independent PDs.

13 Claims, 5 Drawing Sheets

SYSTEM AND METHOD FOR USING AN ETHERNET PHYSICAL LAYER DEVICE TO IDENTIFY CABLING TOPOLOGIES

BACKGROUND

1. Field of the Invention

The present invention relates generally to power over Ethernet (PoE) and, more particularly, to a system and method for using an Ethernet physical layer device (PHY) to identify cabling topologies.

2. Introduction

In a PoE application such as that described in the IEEE 802.3af and 802.3at specifications, a power sourcing equipment (PSE) delivers power to a powered device (PD) over Ethernet cabling. Various types of PDs exist, including voice over IP (VoIP) phones, wireless LAN access points, Bluetooth access points, network cameras, computing devices, etc.

In IEEE 802.3af, a PD may receive power over a single set of two wire pairs from a PSE whether it is a midspan or an endspan. In supporting higher-power applications, additional higher-power PoE specifications can be defined (e.g., IEEE 802.3at) that would allow 2× two wire sets to go out of the same PSE to either an individual PD, which could get double the power, or go to two different PDs.

In general, it is beneficial to find out if multiple sets of wire pairs are going to the same PD. For example, this information can used to establish what a PD may report to the PSE via higher-level protocols. Additionally, this information may also be used to identify that a PD has access to the extra sets of wire pairs for the potential delivery of more power or for power backup. What is needed therefore is a mechanism that enables a power over Ethernet system to identify a cabling topology from the PSE to the PD.

SUMMARY

A system and/or method for using an Ethernet physical layer device (PHY) to identify cabling topologies, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, the identification of whether multiple sets of wire pairs are going to the same PD is a key piece of information that can be used in administrating the provision of power to various PDs. Conventionally, it has not been easy to identify the cabling topology from the PSE to the PD. For example, existing techniques that use the power over Ethernet (PoE) analog domain (voltage, current, etc.) have difficulty distinguishing where the wire pairs are going from the PSE. These deficiencies may be acceptable in legacy low-power systems but in high-power systems (e.g., IEEE 802.3at), it can have an impact on the total amount of power that can be delivered to the PD.

In accordance with the present invention, it is recognized that information generated by the physical layer device (PHY) can be useful in determining the topology from the PSE to the PDs. Conventionally, PHYs have no awareness of PoE. Accordingly, it is a feature of the present invention that information generated by the PHY can be used in association with information generated by the PSE to determine whether multiple sets of wire pairs are going to the same PD or to multiple PDs. The cabling topology between the PSE and the PDs is thereby identified.

Figure 1:
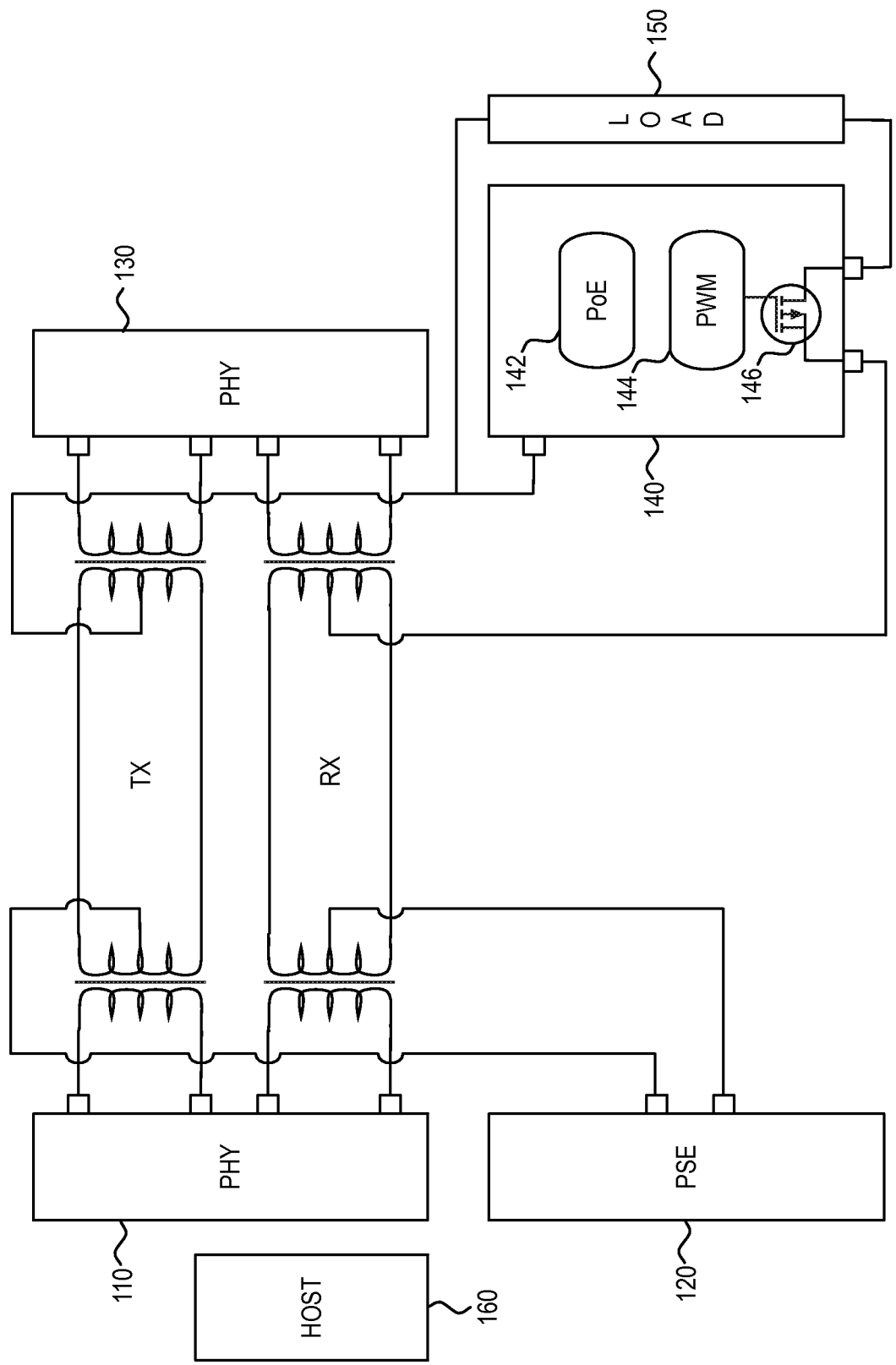
FIG. 1 illustrates an embodiment of a PoE system.

Prior to describing the process by which PHY and PSE generated information is analyzed to determine the cabling topology, a brief description of a PoE system is first provided. FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology. The PoE system also includes host 160. Host 160 can include a local central processor unit (CPU) or simple microcontroller that is designed to interface with PHY 110 and PSE 120.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at draft specification, on the other hand, a PSE may be able to deliver up to 30 W of power to a PD over 2-pairs. Other proprietary solutions can potentially deliver even higher levels of power to a PD. In general, high power solutions are often limited by the limitations of the cabling.

Figure 2:
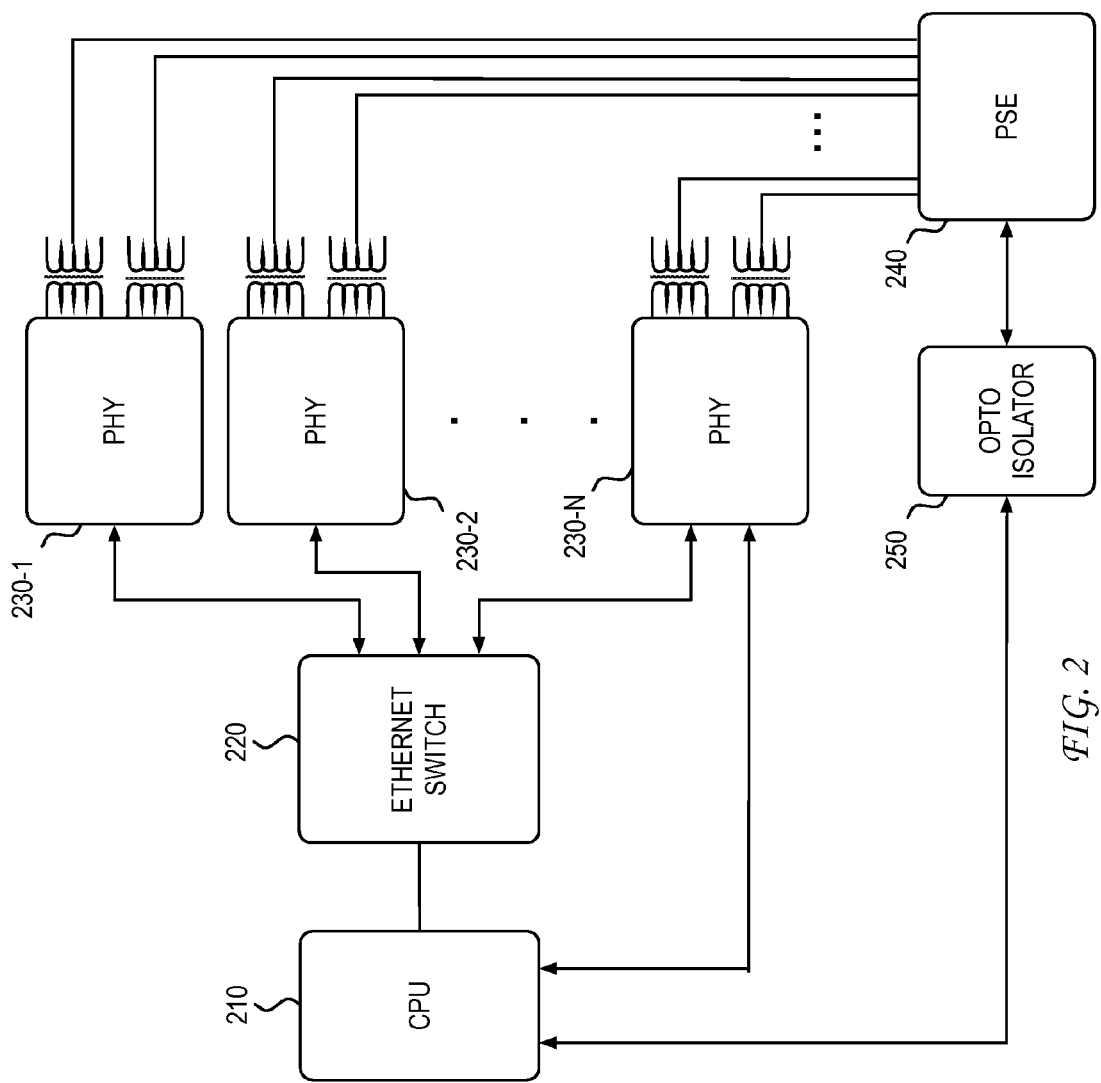
FIG. 2 illustrates another view of a PoE system.

FIG. 2 illustrates another view of a PoE system. As illustrated, the PoE system includes PHYs 230-1 to 230-N that are each connected to Ethernet switch 220. In the illustration of FIG. 2, each PHY 230-1 to 230-N includes a single Ethernet transceiver. As would be appreciated, a PHY can include a plurality of Ethernet transceivers. Each PHY is also connected to CPU 210, although only a single connection from CPU 210 to PHY 230-N is shown for simplicity. In one embodiment, CPU 210 is incorporated along with Ethernet switch 220 and PHYs 230-1 to 230-N on a single chip. In another embodiment, Ethernet switch 220 and PHYs 230-1 to 230-N are incorporated on a single chip separate from CPU 210, wherein communication with CPU 210 is enabled via a serial interface. Also illustrated in FIG. 2 is a PSE 240 that provides power through the center taps of the transformers shown. As illustrated, PSE 240 is also coupled to CPU 210 via opto-isolator 250 that facilitates an isolation boundary.

CPU 210 can also be embodied as a simple microcontroller that can be designed to run firmware or software. CPU 210 is part of the management system (or host system), which interfaces with the various subsystems. One of those subsystems is the PSE subsystem, which includes a PSE controller. The PSE controller performs such functions as discovering a presence of PDs by checking for characteristic signature resistances, performing optional classification, managing/integrating power, and monitoring current draw. Another subsystem is the data subsystem that may include but is not limited to a PHY chip, switch chip, or both.

Figure 3:
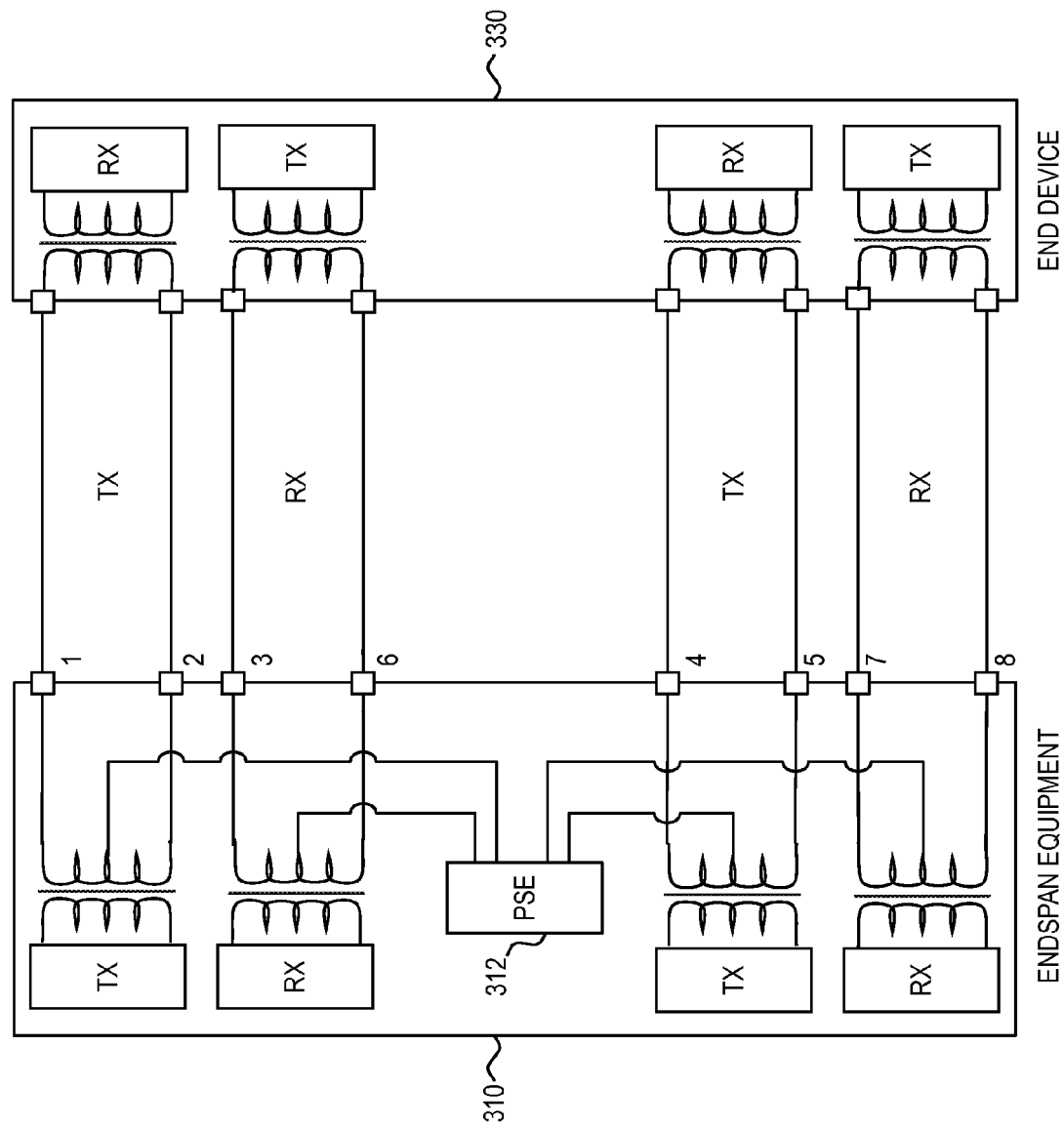
FIG. 3 illustrates an example of endspan powering.

Power delivered from a PSE to various PDs can be accomplished in a variety of ways. FIG. 3 illustrates one example of the delivery of power from endspan equipment. In this example, power is inserted by PSE 312 into two sets of wire pairs that are terminated into a single end device 330. The first set of wire pairs is represented by pins 1, 2, 3, and 6 of the Ethernet cable. The second set of wire pairs is represented by pins 4, 5, 7, and 8 of the Ethernet cable. In the example of FIG. 3, the two sets of wire pairs are used for data transmission (e.g., 1000BASE-T). As would be appreciated, in a configuration such as 100BASE-TX, only a single set of wire pairs (1, 2, 3, 6) would be used for data transmission.

Regardless of whether one or both sets of wire pairs are used for data transmission, power can be inserted by PSE 312 into either one or both of the sets of wire pairs. For example, in a 802.3af PoE application for a 100BASE-TX link that uses the first set of wire pairs (1, 2, 3, 6), PSE 312 can be designed to insert power onto the same set of wire pairs used for data transmission, or onto the unused set of wire pairs (4, 5, 7, 8). On the other hand, in a 802.3at PoE application for the same 100BASE-TX link, PSE 312 can be designed to insert power onto both sets of wire pairs. For the example of 1000BASE-T links, power can be inserted into one of the sets of wire pairs (802.3af) or into both sets of wire pairs (802.3at).

In the example of FIG. 3, it was assumed that all four wire pairs terminated on a single end device 330. This need not be the case, however. For 100BASE-TX applications, only a single set of wire pairs (e.g., 1, 2, 3, 6) need be terminated on an end device, wherein the single set of wire pairs is used for data transmission and possibly for the delivery of power. The second set of wire pairs (e.g., 4, 5, 7, 8) could then be terminated on another end device, wherein the second set of wire pairs is used for data transmission and possibly for the delivery of power.

Figure 4:
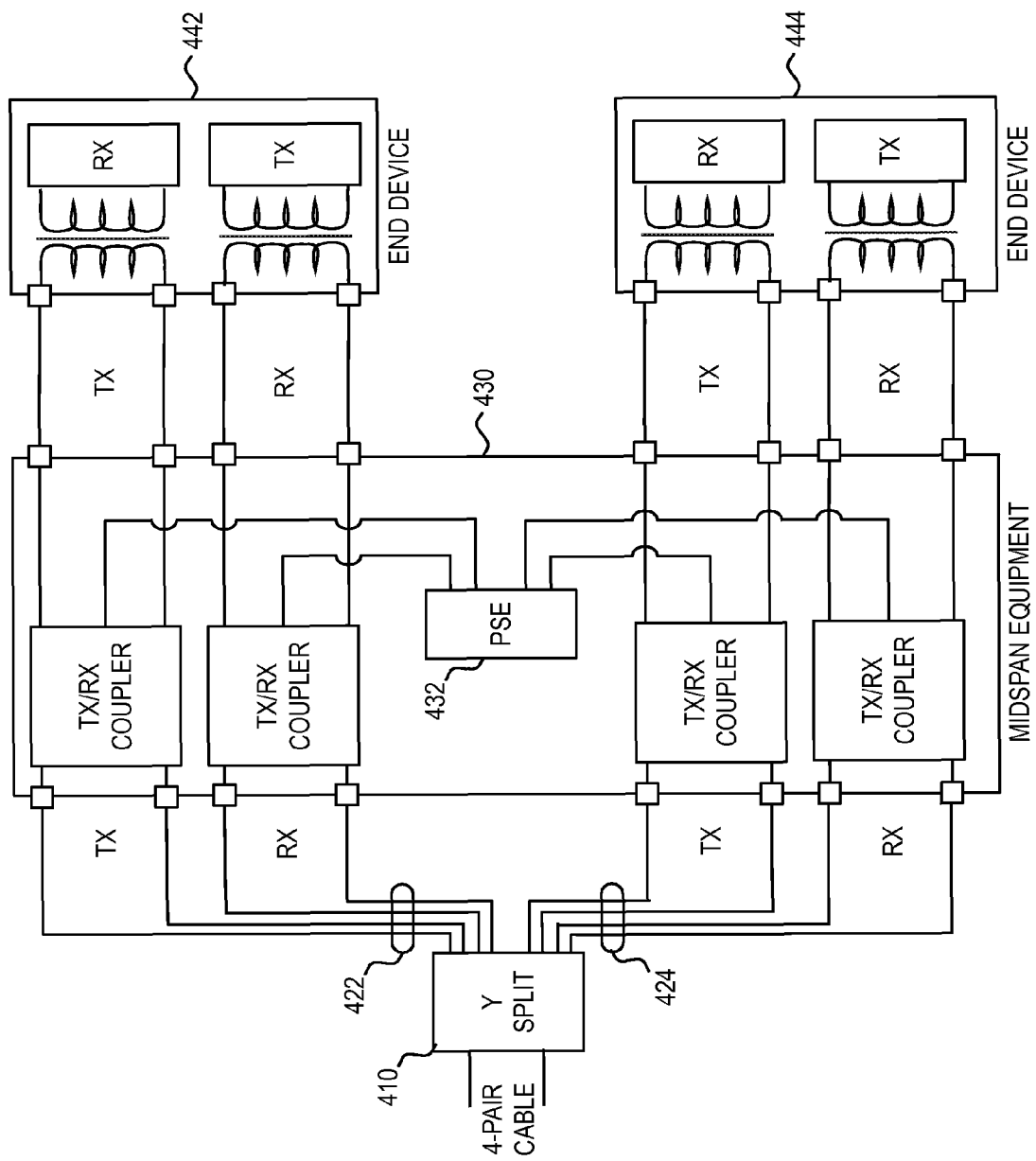
FIG. 4 illustrates an example of midspan powering.

One example of such a scenario is illustrated in FIG. 4 as applied to midspan equipment. A similar configuration could also exist in endspan equipment. As illustrated, a single four-pair Ethernet cable can be coupled to Y connector 410. In this example, Y connector 440 can be designed to split a four-pair cable into two two wire pair groupings 422, 424. A corresponding Y connector can also be included at the other end of the 4-pair cable for connection to the switch.

The two wire pairs in two-pair groupings 422, 424 are provided to midspan equipment 430. The two wire pairs in grouping 422 are used to support end device 442, while the two wire pairs in grouping 424 are used to support end device 444. In one scenario, end devices 442, 444 receive data and power over two wire pairs. In this scenario, PSE 432 in midspan equipment 430 would insert power into the two wire pairs through a pair of TX/RX couplers. In another scenario, one of the end devices receives data and power over two wire pairs, while the other end device receives data only. In yet another scenario, both end devices 432, 434 can be configured to receive data only.

As would be appreciated, various other PoE configurations can exist. For example, there may be situations where the PD may receive power over one pair from the endspan and one from the midspan. In another example, the PD may receive power from two different endspans via a modified cabling.

As various power delivery scenarios can exist in a given PoE system, it is beneficial to understand the cabling topology from the PSEs to the PDs. In accordance with the present invention, information generated by the PHY can be used in association with information generated by the PSE to determine a cabling topology.

Consider first a scenario where a single PHY exists for the four wire pairs (or two sets of two wire pairs) on the PSE side. In this scenario, if the PHY has gigabit or greater capability, then the PHY can potentially use all four wire pairs in establishing data communication with a single end device. Accordingly, an initial determination can be performed as to whether a PHY has negotiated to a gigabit (e.g., 1000BASE-T) or greater speed. If the PHY has negotiated to a gigabit or greater speed, then it can be concluded that all four wire pairs are terminated onto a single PD. Here, if the PSE detects one PD signature on the two sets of wire pairs, then two-pair power is being used. Alternatively, if the PSE detects two PD signatures on the two sets of wire pairs, then four-pair power is being used.

If the single PHY has negotiated to less than a gigabit speed (e.g., 100BASE-TX), then a different process is used to determine the cabling topology. In one example, the PSE can first determine whether one or two PD signatures exist on the four wire pairs. If one PD signature exists, then the process would complete since power could not be expanded beyond a single set of wire pairs. If, on the other hand, two PD signatures exist on the two sets of wire pairs, then further information would be needed to determine the cabling topology.

In one embodiment, the PHY could determine if there is link energy on the other set of wire pairs. If link energy exists on the other set of wire pairs, then it can be concluded that two separate PDs are coupled to that PHY on the PSE side. This topology would therefore preclude the possibility of either of the two PDs from receiving more power from an extra set of wire pairs. If link energy does not exist on the other set of wire pairs, then either four-pair power is being used by a less than gigabit PD, or there exists another PD that doesn't have a PHY. To distinguish between those two scenarios, the PHY can perform a distance diagnostic (e.g., time domain reflectometry), look at noise characteristics (e.g., insertion loss, crosstalk, etc.), or examine connector signatures to determine whether the two sets of wire pairs are being terminated at the same distance or different distances from the PHY at the PSE side. If the PHY's measurements indicate that the two sets of wire pairs span the same distance, then a single PD exists. On the other hand, if the PHY's measurements indicate that the two sets of wire pairs span a different distance, then two PDs exist. The cabling topology is therefore identified.

The above description addressed the scenario of four wire pairs being connected to a single PHY on the PSE side. If the four wire pairs are connected to two independent PHYs on the PSE side than a different diagnostic can be used. In this case, the wiring of a first set of wire pairs to a first PHY and the wiring of a second set of wire pairs to a second PHY would indicate that each PHY can negotiate to less than gigabit speeds only. Each PHY could then examine the cable characteristics of their respective set of wire pairs. If the cable characteristics indicate that the two sets of wire pairs span different distances, then two separate PDs exist. If the cable characteristics indicate that the two sets of wire pairs span roughly the same distance, then further checking is needed. Here, it can be determined whether link energy exists on both sets of wire pairs. If link energy does exist on both sets of wire pairs, then two separate PDs exist. If link energy does not exist on both sets of wire pairs, then a single PD exists. The existence of two PD signatures would indicate the capability of four-pair power for the single PD.

As the scenarios described above set forth, a determination of the cabling topology can be based on the combination of information that can be gained from both the PSE subsystem and the PHY subsystem. Here, the PHY subsystem can provide information (e.g., negotiated speed, link energy, cable characteristics, etc.) that the PSE subsystem cannot otherwise obtain by itself. In combination, the PHY subsystem information and the PSE subsystem information can be used to determine the cabling topology.

Figure 5:
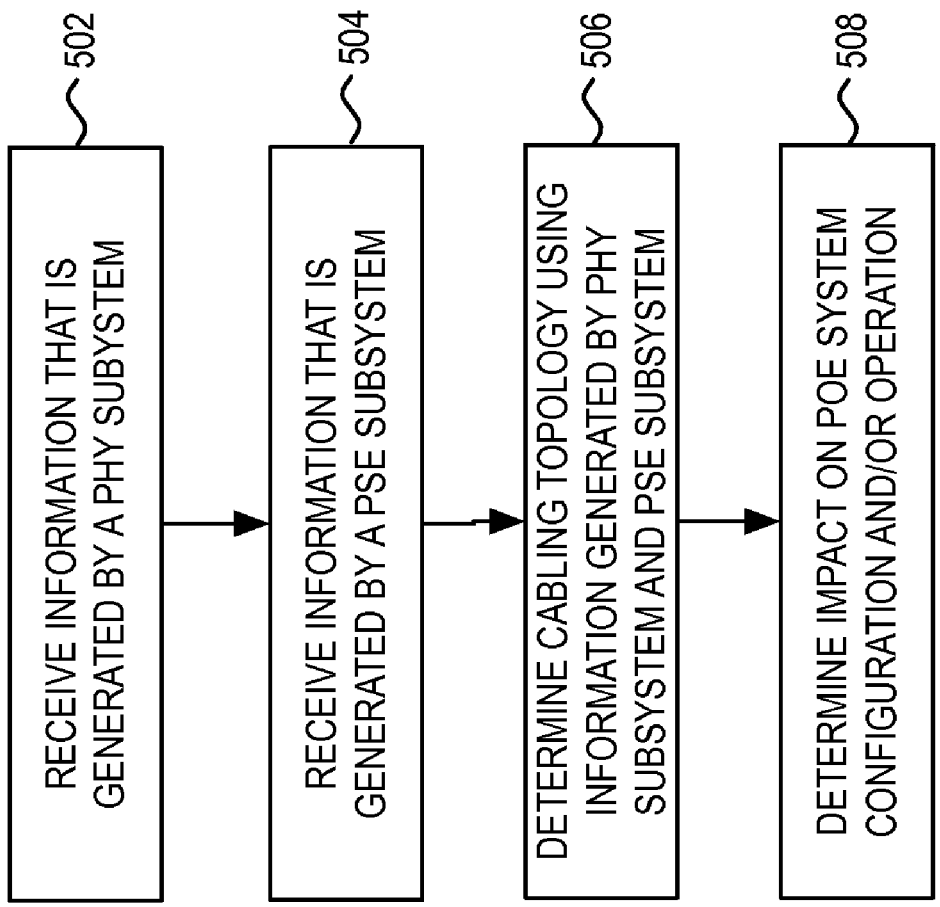
FIG. 5 illustrates a flowchart of a process of the present invention.

FIG. 5 illustrates a flowchart of a process of this information flow. At step 502, information (e.g., negotiated speed, link energy, cable characteristics, etc.) generated by the PHY subsystem is received. In one embodiment, the information is received by a local CPU for subsequent cabling topology determination. In another embodiment, the information is received at the PSE subsystem for subsequent cabling topology determination. At step 504, information (e.g., existence of PD signatures) that is generated by the PSE subsystem is received. Again, this information can be received by the local CPU and/or remain at the PSE subsystem for processing.

With information generated by both the PHY subsystem and the PSE subsystem being available, the local CPU or PSE subsystem can then determine the cabling topology at step 506. As would be appreciated, the principles of the present invention are not entirely dependent on a specific mechanism by which the cabling topology is identified. More significantly, it is the availability of the combination of PHY subsystem and PSE subsystem information that enables a new mechanism for determining a cabling topology. In general, by combining the information from the PHY subsystem with that of the PSE subsystem, the cabling topology to the PD can be determined in most situations while ruling out possibilities in others.

After the cabling topology is identified, an impact on the PoE system can then be determined at step 508. In one example, the cabling topology information can be used to affirm what the PD may report to the PSE via higher-level protocols. In another example, the cabling topology information may be used to identify that the PD has access to an extra set of wire pairs for the provision of additional power or for power backup.

One of the advantages of using the PHY as described above is that the cabling topology can be identified without powering or doing anything to the wires themselves. The principles of the present invention therefore yield a passive and non-intrusive technique. Reliance on a complex analog scheme in the PoE domain is thereby averted.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a power over Ethernet system for identifying a topology of a cable, comprising:
   determining whether a first powered device signature exists on a first set of wire pairs in the cable;
   determining whether a second powered device signature exists on a second set of wire pairs in the cable; and
   if said determinations indicate an existence of said first and said second powered device signatures, then determining whether said first set of wire pairs and said second set of wire pairs are connected to different powered devices based on information obtained from a physical layer device that is coupled to said first and second set of wire pairs.

2. The method of claim 1, wherein said information obtained from said physical layer device is a negotiated Ethernet speed.

3. The method of claim 1, wherein said information obtained from said physical layer device is a link energy.

4. The method of claim 1, wherein said information obtained from said physical layer device is a distance measurement between a power sourcing equipment and a powered device.

5. A method in a power over Ethernet system for identifying a topology of a cable, comprising:
   receiving information that enables a determination of whether a first powered device signature exists on a first set of wire pairs in the cable and whether a second powered device signature exists on a second set of wire pairs in the cable; and
   receiving information from a physical layer device that is coupled to said first and second set of wire pairs; and
   if said first and said second powered device signatures exist, then determining whether said first set of wire pairs and said second set of wire pairs are connected to different powered devices based on said information received from said physical layer device.

6. The method of claim 5, wherein said information obtained from said physical layer device is a negotiated Ethernet speed.

7. The method of claim 5, wherein said information obtained from said physical layer device is a link energy.

8. The method of claim 5, wherein said information obtained from said physical layer device is a distance measurement between a power sourcing equipment and a powered device.

9. A method in a power over Ethernet system for identifying a topology of a cable having a first and second set of wire pairs, comprising:
   determining whether said first set of wire pairs is connected to a first powered device and whether said second set of wire pairs is connected to a second powered device different from said first powered device, wherein said determination is based on information that is generated from a physical layer device subsystem and on information that is generated by a power over Ethernet subsystem.

10. The method of claim 9, wherein said information obtained from said physical layer device subsystem is a negotiated Ethernet speed.

11. The method of claim 9, wherein said information obtained from said physical layer device subsystem is a link energy.

12. The method of claim 9, wherein said information obtained from said physical layer device subsystem is a distance measurement between a power sourcing equipment and a powered device.

13. The method of claim 9, wherein said information obtained from said power over Ethernet subsystem is an existence of a powered device signature.

* * * * *